Figure 1:
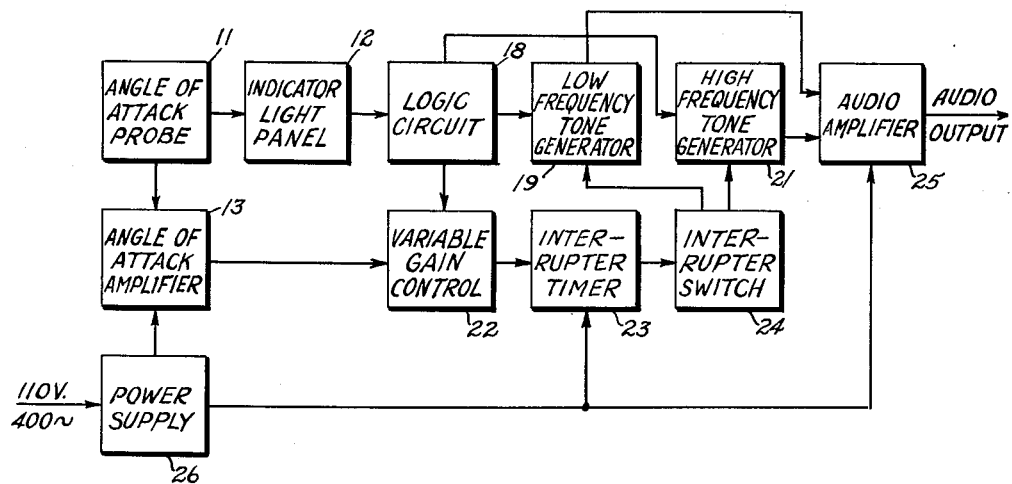

May 7, 1963 J. P. STAPLES 3,089,119
AURAL LANDING SPEED SYSTEM
Filed Nov. 29, 1960 2 Sheets-Sheet 1

INVENTOR.
JOHN P. STAPLES
BY
ATTORNEYS

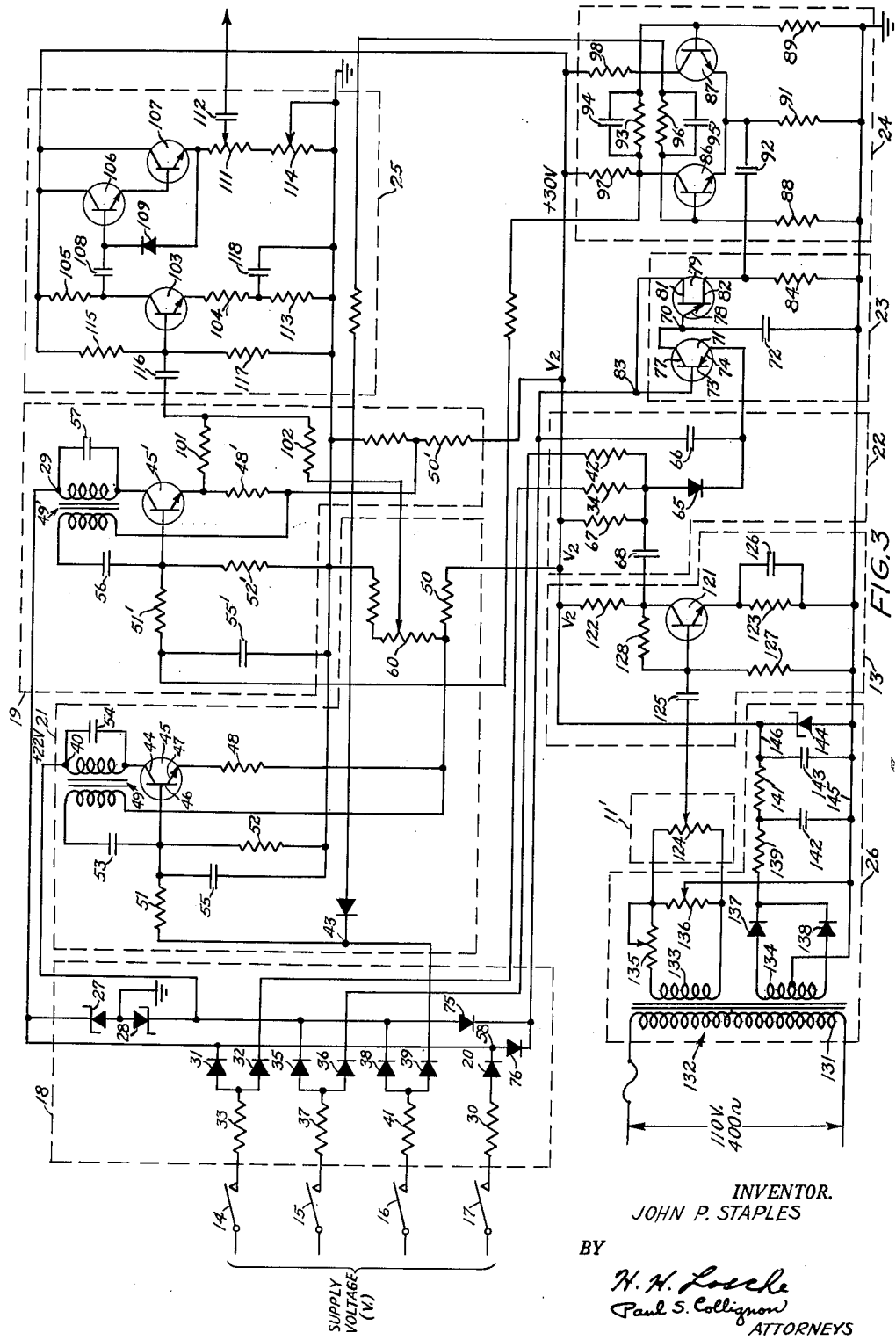

United States Patent Office 3,089,119
Patented May 7, 1963

3,089,119
AURAL LANDING SPEED SYSTEM
John P. Staples, Indianapolis, Ind., assignor to the United States of America as represented by the Secretary of the Navy
Filed Nov. 29, 1960, Ser. No. 72,531
5 Claims. (Cl. 340—27)
(Granted under Title 35, U.S. Code (1952), sec. 266)

The invention described herein may be manufactured and used by or for the Government of the United States of America for governmental purposes without the payment of any royalties thereon or therefor.

The present invention relates to a device for aiding a pilot in the landing of an aircraft and more particularly to a device that provides a pilot of an aircraft with an aural signal that indicates the condition of the landing approach angle of attack.

Various systems have employed, and are being employed, for aiding the landing of airplanes. For airplanes that are landing at airports, various systems are employed for making a blind landing, that is, the landing of an aircraft when visibility is low, as through a dense fog. In many of these blind landing devices, radar beacons are successively spaced a few miles from the airport and a signal is beamed to the aircraft. A visual indicator is provided in the airplane to indicate whether the approach is above or below the desired glide path, and also an azimuth indication is provided.

As it is not possible on an aircraft carrier to have a number of radar beacons spaced a few miles apart, other means are employed to assist to pilot in landing his aircraft. One method used in the past employed a landing signal officer, who observed the attitude and approach of an airplane that was approaching and signaled, by means of paddles, to the pilot so that the approach could be correct. A later method, and one in wide use today, employs an optical landing mirror. The pilot views a convex mirror that is reflecting a spot of light and, by orienting the aircraft so that the spot of light is aligned with a horizontal bank of lights, the proper approach is made.

The present invention provides an aural tone for the pilot of an aircraft from information received from an angle of attack probe. One of five different tones is heard by the pilot depending upon the condition of his angle of attack. When the angle of attack is low, the pilot hears a high frequency tone (1350 cycles per second) that is interrupted at a variable rate (2–5 cycles per second). If the angle of attack is nearly correct, but low, the pilot hears a steady high frequency tone. When the angle of attack is correct, as predetermined for the particular airplane being flown, the pilot hears a steady high frequency tone plus a low frequency tone (200 cycles per second) that is interrupted every half-cycle. If the angle of attack is nearly correct but high, a steady high frequency tone plus a low frequency tone interrupted every two cycles is heard. When the angle of attack is high and the aircraft is approaching a stall condition, a low frequency tone interrupted at a variable rate (2–5 cycles per second) is heard.

It is therefore a general object of the present invention to provide an aircraft pilot with aural information to be used for aiding in the landing of an aircraft.

Another object of the present invention is to communicate to a pilot of an aircraft, an aural tone which will indicate the angle of attack of aircraft during landing operations.

Figure 2:
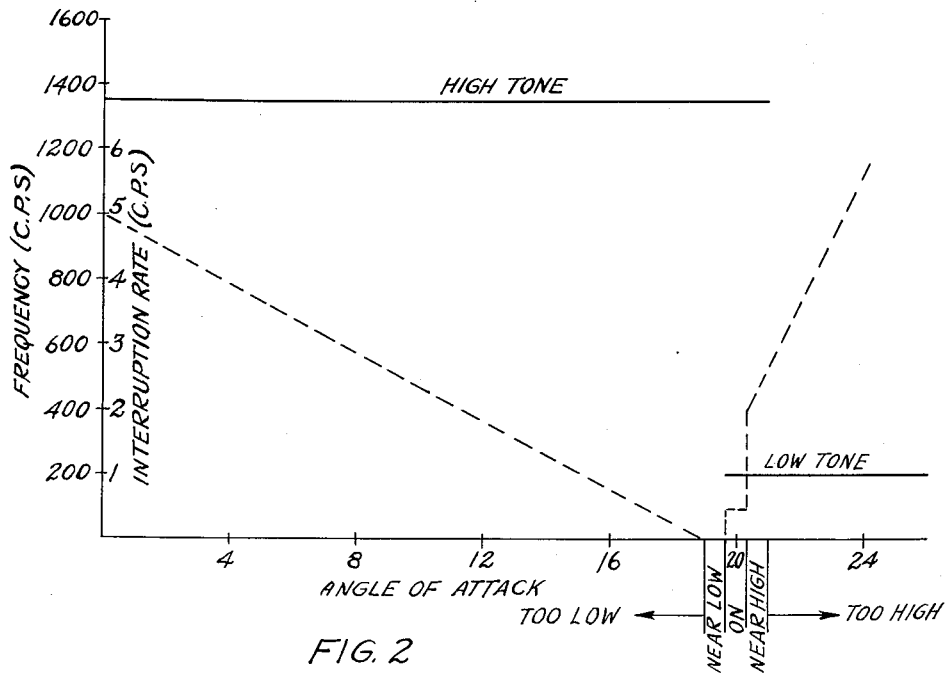

Other objects and advantages of the present invention will be readily appreciated as the same becomes better understood by reference to the following detailed description when considered in connection with the accompanying drawings in which:

FIG. 1 is a block circuit diagram showing the components of the present invention;
FIG. 2 is a chart showing the different sound condition for different angles of attack; and
FIG. 3 is a schematic diagram showing the details of the present invention.

Referring now to FIG. 1 of the drawings, there is shown an angle of attack probe 11 which supplies information to and indicator light panel 12 and an angle of attack amplifier 13. The angle of attack probe 11 is part of a bridge circuit consisting of a potentiometer across the output of an angle of attack transducer. The use of a bridge circuit makes it possible to have a zero signal correspond to some preset value of angle of attack. The output of probe 11 is a 400 c.p.s. signal having a voltage proportional to the deviation of the angle of attack from a preset initial value. The angle of attack amplifier 13 increases the output from probe 11 to a power level necessary for the operation of the other components in the system.

The indicator light panel 12 is provided with four lights that are operated by the probe 11 through a servo (not shown). The indicator light panel 12 is also provided with four switches, which are designated by numerals 14, 15, 16, and 17 in FIG. 3 of the drawings and these switches permit the passage of input information from the probe 11 to the other components of the system.

Referring again to FIG. 1 of the drawings, it can be seen that a logic circuit 18 is connected to the indicator light panel 12. Logic circuit 18 consists of nine diodes which prevent coupling between the indicator light panel 12 and the remainder of the system. These diodes turn on the correct oscillator frequency supplied by the tone generators 19 and 21, and also control the interruption rate of the tones through the variable gain control 22. Both the low frequency tone generator 19 and the high frequency tone generator 21 are Hartley oscillators, well known in the art, whose frequencies are 200 cycles per second and 1350 cycles per second, respectively.

The variable gain control 22 rectifies the angle of attack amplifier's A.-C. output and feeds the resulting signal through resistors introduced by the logic current 18. The final output of the variable gain control 22 in a D.C. signal which is equal to the amplitude of the A.C. input multiplied by a constant, K. The value of the K has three separate values which correspond to the three interruption rates, namely, an interruption rate of one-half cycle, and two variable rates of 2–5 cycles per second.

An interrupter timer 23 is provided which receives the D.C. output from the variable gain control and produces a square wave whose frequency is proportional to the amplitude of its D.C. input. The output of the interrupter 23 is applied to an interrupter switch 24. Interrupter switch 24 is a bistable multivibrator whose frequency is controlled by the output of the interrupter timer 23. The output of the interrupter switch turns the tone generators off and on providing the indicator light panel switches are in the proper condition.

An audio amplifier 25 receives the tone generator outputs and amplifies the tone signals to a level sufficient to feed the aircraft intercommunication system. Power supply 26, which has a 110 volt, 400 cycle input, supplies D.C. voltage to the angle of attack amplifier 13, the interrupter timer 23, and the audio amplifier 25.

Referring now to FIG. 3 of the drawings, the various components of the present invention are described in detail.

*Logic Circuit*

The logic circuit 18 is provided in order to transfer information from the angle of attack probe 11 through switches 14 through 17 to the aural landing speed system while isolating switches 14 through 17 from the system. The logic circuit is arranged so that two zener diodes 27 and 28 regulate all four input voltages from the indicator light panel 12. Diodes 31 and 32 each have one end connected to switch 14 through resistor 33. Diode 31 has its other end coupled to junction point 29 in the low frequency tone generator 19, and diode 32 has its other end coupled to one end of resistor 34, which is in the variable gain control 22. Likewise, a pair of diodes 35 and 36 are connected to switch 15 through resistor 37 and a pair of diodes 38 and 39 are connected to switch 16 through resistor 41. Diodes 35 and 38 each have one end connected to junction point 40 in the high frequency tone generator 21 and diode 36 has its other end connected to one end of resistor 42 in the variable gain control 22. Diode 39 has its other end connected to junction point 43 in the high frequency tone generator 21. Diode 20 has one end connected to switch 17 through resistor 30 and the other end is connected to junction point 58.

It can thus be seen that when either switch 14 or switch 17 is closed, which occurs when either the angle of attack is "high" or "on," respectively, supply voltage is applied to the low frequency tone generator 19. When the angle of attck is "low" or "near," which results in either switch 15 or 16, respectively, being closed, the supply voltage is applied to the high frequency tone generator 21. Also, when the angle of attack is "near," the interrupter timer 23 is blocked by the supply voltage from the indicator light panel 12. If the angle of attack is either "high" or "low," separate impedances are present in the indicator light panel 12 and the interrupter timer 23 is provided two different chopping rates for the same supply voltage from the logic circuit 18.

Tone Generators

Two Hartley oscillators are provided as tone generators to produce frequencies of 200 and 1350 cycles per second. Referring particularly to the high frequency tone generator 21, the supply voltages $V_1$ and $V_2$ for the tone generators are provided from the logic circuit 18 and the power supply 26, respectively. Oscillations are prevented when $V_1$ is disconnected from the collector 44 of transistor 45. When supply voltage $V_2$ is present, the base drive from the interrupter switch 24 turns the oscillator on and off. When $V_1$ is applied to the base 46 of transistor 45, the circuit oscillates continuously since $V_1$ exceeds the voltage of the interrupter switch 24.

Resistors 50 and 60 are used to bias the emitter 47 positively to prevent continuous oscillation, since the interrupter switch 24 does not go to zero. Thus, during the off half cycle, the voltage appearing at the base 46 of transistor 45 is negative with respect to the emitter 47 and oscillation is prevented. Resistor 48 is provided as an impedance to the secondary of transformer 49, and resistor 48 is selected to properly adjust the secondary loading.

A self-biasing, self-starting base leak circuit is provided by resistors 51 and 52 and capacitor 53. Capacitor 53 can also be used to series tune the resonant circuit. Capacitor 54, which is connected across the secondary winding of transformer 49, is provided as a fine tuning adjustment for parallel resonance in the collector circuit. Capacitor 55 is provided in order to prevent the oscillations of the tone generator from being fed back to the interrupter switch 24. The frequency of the high frequency tone generator is determined by the values of capacitors 53 and 54, and for the low frequency tone generator, the corresponding capacitors for control of the frequency are numbered 56 and 27.

The following table lists the values for the various components of the tone generators, it being understood, of course, that various changes can be made without departing from the scope of the invention:

| Component number: | Value |
|---|---|
| 48 and 48' | ohms— 470 |
| 50 and 50' | do— 12K |
| 51 and 51' | do— 15K |
| 52 and 52' | do— 33K |
| 53 | microfarad— .22 |
| 54 | do— .001 |
| 55 and 55' | do— .22 |
| 56 | do— 1.0 |
| 57 | do— .22 |
| 60 | ohms— 2.5K |

Variable Gain Control

The function of the variable gain control 22 is to provide a suitable input signal for the interrupter timer 23, whose output frequency is proportional to input current. The variable gain control 22 is a half-wave rectifier circuit comprised of a diode 65 and a filter capacitor 66. In addition to rectifying the input signal, the variable gain control supplies three different current levels which result in three different chopping rates in the interrupter timer 23. The logic circuit 18 controls the current level through switches 14 and 15. The three desired current levels are achieved by bleeding current from $V_1$ through dropping resistors 34 and 42, and also from the current supplied by the main power supply 26 through resistor 67. Coupling capacitor 68 provides direct current isolation from the angle of attack amplifier 13.

The voltage $V_2$ from power supply 26 provides, through resistor 67, a constant current bias to the output of the variable gain control. This constant current bias is provided to allow the interrupter timer 23 to operate when switches 14 and 15 are open. Resistor 67 is selected so that approximately 100 microamps of current flow produces a one cycle per second interruption rate. As resistors 34 and 42 operate as current-adding impedances, they are selected to provide the desired chopping rates as the angle of attack varies.

The following table lists the value of the various components of the variable gain control:

| Component number: | Value |
|---|---|
| 34 | ohms— 2.0K |
| 42 | do— 3.9K |
| 66 | microfarads— 4 |
| 67 | ohms— 100K |
| 68 | microfarads— 4 |

Interrupter Timer

The interrupter timer 23 generates an output signal whose frequency is proportional to input current. The desired frequency range is 1–10 cycles per second. A grounded base transistor 71 is provided that acts as a constant current source for timing capacitor 72. One voltage input ($V_1$) is applied to the base 73 of transistor 71 through the logic circuit 18. A second input voltage ($V_2$), which is obtained through the variable gain control 22, is applied to the emitter 74 of transistor 71. Diodes 75 and 76 in the logic circuit 18 are provided in order that the two input voltages are the same. The collector 77 of transistor 71 is connected to junction point 70, which is common to one end of capacitor 72 and the emitter 78 of unijunction transistor 79. Ohmic base contact 81 of unijunction transistor 79 is connected to junction point 83 which is common to voltage $V_1$ and the base 73 of transistor 71. Ohmic base contact 83 is connected to ground through resistor 84.

In operation, the output current of the grounded base stage depends upon the input voltage and its source impedance. The resulting signal across capacitor 72 is a linear sawtooth whose amplitude is constant, but whose frequency is dependent upon current. When the potential across capacitor 72 reaches a given percentage of the supply voltage ($V_1$) unijunction transistor 79 conducts and discharges the timing capacitor 72 through resistor 84. As capacitor 72 discharges, the potential falls too low for unijunction transistor 79 to maintain conduction. Once transistor 79 ceases to conduct, capacitor 72 recharges. The repetition frequency of the resulting output pulses which appear across resistor 84 is equal to the sawtooth frequency. The amplitude and width of the output pulses are determined by the unijunction firing potential and by capacitor 72 and resistor 84. The output of interrupter timer 23 is applied to the interrupter switch 24.

Interrupter Switch

Interrupter switch 24 is a bistable, emitter-coupled multivibrator, which turns the tone generators off and on at a rate determined by the interrupter timer 23. Transistors 86 and 87 are provided and have their emitters connected. As shown, the bases of transistors 86 and 87 are cross-coupled through a resistor-capacitor combination to the collectors of the opposite transistors. Thus one transistor is off, or nonconducting, while the other transistor is on, or conducting. By adding resistors 88 and 89 from base to ground, the off transistor has both junctions reverse biased for greater stability.

When a pulse is received from the interrupter timer, the conducting transistor is turned off and the nonconducting transistor is turned on. The outputs of the interrupter switch 24 are applied to the tone generator, and in operation, when transistor 86 is off the high frequency tone generator 21 is on, and likewise as transistor 87 is on when transistor 86 is off, the low frequency tone generator 19 is off.

The following table gives the values of the components used in the interrupter switch:

| Component number: | | Value |
|---|---|---|
| 88 | ohms__ | 10K |
| 89 | do____ | 10K |
| 91 | do____ | 1.0K |
| 92 | microfarad__ | 0.22 |
| 93 | ohms__ | 15K |
| 94 | microfarad__ | 0.22 |
| 95 | do____ | 0.22 |
| 96 | ohms__ | 15K |
| 97 | do____ | 8.2K |
| 98 | do____ | 8.2K |

Audio Amplifier

The audio amplifier 25 amplifies the interrupted tone generator outputs to a level required to operate the aircraft intercommunication system. Audio amplifier 25 is connected to the low frequency tone generator 19 and the high frequency tone generator 21 through resistors 101 and 102, respectively. Transistor 103 is a voltage amplifier incorporating negative feedback. Resistor 104 is placed in the emitter circuit to minimize the input impedance and gain variation. The gain of the first stage is approximately equal to the value of resistor 105 divided by the value of resistor 104. Bypass capacitor 118 is provided in order to prevent emitter degeneration.

The second stage of amplifier 25 is comprised of transistors 106 and 107 which form a cascaded follower circuit whose operational bias is furnished by capacitor 108 and diode 109. When a signal is not being provided by transistor 103, no bias is provided and no current flows through either transistor 106 or 107. When a signal appears at the output of transistor 103, shunt rectification action of diode 109 and capacitor 108 produces positive bias at the base of transistor 106. Hence, the amplifier biases itself to the average of the amplitude of the input signal.

The following table lists the value of the various components of the audio amplifier:

| Component number: | | Value |
|---|---|---|
| 105 | ohms__ | 5.1K |
| 108 | microfarad__ | 0.47 |
| 111 | ohms__ | 250 |
| 112 | microfarads__ | 33 |
| 113 | ohms__ | 1.8K |
| 114 | do____ | 50 |
| 115 | do____ | 51K |
| 116 | microfarad__ | 0.47 |
| 117 | ohms__ | 15K |
| 118 | microfarads__ | 4 |

Angle of Attack Amplifier

The angle of attack amplifier 13 functions as an isolation circuit and voltage amplifier for the angle of attack sensor signal. Amplifier 13 is similar to the first stage of the audio amplifier 25, and includes a transistor 121 having negative feedback. The gain of the amplifier is approximately equal to the value of resistor 122 divided by the value of resistor 123. As shown in FIG. 3 of the drawing, the base of transistor 121 is connected to resistor 124, which is located in the angle of attack probe, through coupling capacitor 125. Bypass capacitor 126 is provided in order to prevent emitter degeneration.

The following table lists the value of the various components of the angle of attack amplifier:

| Component number: | | Value |
|---|---|---|
| 122 | ohms__ | 5.1K |
| 123 | do____ | 2.2K |
| 125 | microfarads__ | 0.22 |
| 126 | do____ | 4 |
| 127 | ohms__ | 33K |
| 128 | do____ | 51K |

Power Supply

Power supply 26 provides the necessary D.C. voltage for the operation of the various components of the aural landing speed system. The primary winding 131 of a transformer 132 is connected to a voltage source and two secondary windings 133 and 134 are provided, winding 134 being center-tapped. Variable resistors 135 and 136 are connected to the secondary winding 133. Variable resistor 135 is provided as a gain control and variable resistor 136 is provided as a bridge adjustment to vary the "on" position for the angle of attack, as different aircraft, on landing, have different optimum angles of attack.

Diodes 137 and 138 are connected to the end taps of secondary winding 134 and serve as a full wave rectifier. Resistors 139 and 141, along with capacitors 142 and 143, are provided as a filter system. Zener diode 144 is connected across the center tap lead 145 and lead 146, and functions as a reference source. The direct current output of power supply 26 is supplied to the amplifier 13, interrupter timer 23, and the audio amplifier 25.

The following table lists the value of the various components of the power supply:

| Component Number: | | Value |
|---|---|---|
| 135 | ohms__ | 10K |
| 136 | do____ | 2.5K |
| 139 | do____ | 39 |
| 141 | do____ | 39 |
| 142 | microfarads__ | 33 |
| 143 | do____ | 33 |

Operation

In operation, the angle of attack probe 11 detects or senses the angle of attack of an airplane approaching for a landing and by means of a servo and various cams, switches 14 through 17 are selectively actuated depending upon the condition of the angle of attack. The following table shows the switches that are actuated, and the sound heard by the pilot, for the various conditions of the angle of attack:

| Angle of Attack | Switch Condition | Audio Tone |
|---|---|---|
| Too high | Switch 14 closed | Low frequency tone interrupted at a rate which increases with increasing angles of attack. |
| Near optimum, but high. | Switches 14 and 16 closed. | Steady high frequency tone plus a low frequency tone interrupted at a rate beginning at two cycles and increasing with increasing angles of attack. |
| Correct angle of attack. | Switches 16 and 17 closed. | Steady high frequency tone plus a low frequency tone interrupted at one-half cycle. |
| Near optimum, but low. | Switch 16 closed | Steady high frequency tone. |
| Too low | Switch 15 closed | Steady high frequency tone interrupted at a rate which increases with decreasing angles of attack. |

The above conditions are illustrated graphically in FIGURE 2 of the drawings that show the various tones and interruption rates for various angles of attack.

In addition to supplying a voltage through switches 14 through 17 to the tone generators, the angle of attack probe 11 provides a voltage signal proportional to the deviation of the angle of attack from a preset initial value. This voltage, which appears across resistor 124, is amplified by amplifier 13 to a power level necessary for succeeding operations. The A.C. output of amplifier 13 is rectified by the variable gain control 22 and fed through resistors selected by switches 14 through 17. The final output of the variable gain control 22 is a direct current signal which is equal to the amplitude of the A.C. input multiplied by a constant, K. The constant, K, has three separate values corresponding to the three interruption rates, namely, one-half cycle, and two rates that are variable from 2–5 cycles.

The output of the variable gain control is received by the interrupter timer 23 which produces a square wave whose frequency is proportional to the amplitude of its direct current input. Thus it can be seen that the voltage signal from probe 11 that is proportional to the angle of attack of the airplane has been changed to a frequency that is now proportional to angle of attack. The output of the interrupter timer 23 is applied to the interrupter switch 24 which turns off and on the tone generators 19 and 21. Audio amplifier 25 receives the tone generator outputs and amplifies these signals to a level sufficient to feed the aircraft intercommunication system.

It can thus be seen that the present invention provides a novel device for furnishing aural information to the pilot of an aircraft that will assist him in making a landing.

Obviously many modifications and variations of the present invention are possible in the light of the above teachings. It is therefore to be understood that the invention may be practiced otherwise than as specifically described.

What is claimed is:

1. An aural tone system for use in landing an aircraft comprising: an angle of attack probe for providing a signal output proportional to the angle of attack of an aircraft, a first tone generator for providing a constant low frequency audio tone, a second tone generator for providing a constant high frequency audio tone, means for selectively connecting said first and second tone generators to said signal output, and means for interrupting said audio tones at variable rates.

2. An aural tone system for use in landing an aircraft as set forth in claim 1 wherein said means for interrupting said audio tones includes a bistable emitter-coupled multivibrator.

3. A system for producing a plurality of aural tones for use in landing an aircraft comprising: a probe providing an output voltage proportional to angle of attack of an aircraft, a first oscillator providing a constant low frequency audio tone, a second oscillator providing a constant high frequency audio tone, a logic circuit selectively connecting said first and second oscillators with said output voltage, an interrupter switch for interrupting said audio tones, and timing means connected to said interrupter switch whereby said audio tones are interrupted at different rates.

4. A system for producing a plurality of aural tones for use in landing an aircraft as set forth in claim 3 wherein said timing means provide an output signal having a frequency proportional to the input current of said timing means, and said interrupter switch comprises a bistable, emitter-coupled multivibrator connected to said output signal.

5. A system for producing a plurality of aural tones for use in landing an aircraft comprising: a probe providing an output voltage proportional to angle of attack of an aircraft, a first tone generator providing a low frequency tone, a second tone generator providing a high frequency tone, a logic circuit selectively connecting said tone generators with said output voltage, an interrupter timer providing an output signal having a frequency proportional to input current, an interrupter switch connected to said interrupter timer and said first and second tone generators, and variable gain control means connected between said logic circuit and said interrupter timer for providing different levels of input current to said interrupter timer.

References Cited in the file of this patent

UNITED STATES PATENTS

| 2,386,992 | Trott | Oct. 16, 1945 |
| 2,445,712 | Forbes | July 20, 1948 |
| 2,519,015 | Bensen | Aug. 15, 1950 |
| 2,941,400 | Nesbitt | June 21, 1960 |